United States Patent
Rajeev et al.

(10) Patent No.: US 11,320,955 B2
(45) Date of Patent: May 3, 2022

(54) SERVER CONTROLLED FRAMEWORK FOR CONTROLLING WIDGETS OF A TABULAR STRUCTURE

(71) Applicant: Tata Consultancy Services Limited, Mumbai (IN)

(72) Inventors: Aswin Rajeev, Pune (IN); Prasenjit Das, Kolkata (IN); Anagha Nikhil Mehrotra, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/733,495

(22) PCT Filed: Nov. 27, 2018

(86) PCT No.: PCT/IB2018/059334
§ 371 (c)(1),
(2) Date: Aug. 11, 2020

(87) PCT Pub. No.: WO2019/162747
PCT Pub. Date: Aug. 29, 2019

(65) Prior Publication Data
US 2021/0103362 A1     Apr. 8, 2021

(30) Foreign Application Priority Data
Feb. 20, 2018   (IN) .............................. 201821006492

(51) Int. Cl.
*G06F 3/0481*     (2022.01)
*G06F 9/451*      (2018.01)
(Continued)

(52) U.S. Cl.
CPC ............ *G06F 3/0481* (2013.01); *G06F 9/451* (2018.02); *G06F 16/958* (2019.01); *G06F 40/177* (2020.01); *G06F 40/18* (2020.01)

(58) Field of Classification Search
CPC ...... G06F 3/0481; G06F 9/451; G06F 16/958; G06F 40/177; G06F 40/18
See application file for complete search history.

(56) References Cited

U.S. PATENT DOCUMENTS 9,424,333 B1 *  8/2016  Bisignani .............. G06F 40/186
9,747,005 B1 *  8/2017  Mahmood ........... G06F 16/9577
(Continued)

OTHER PUBLICATIONS

International Search Report for International Application No. PCT/IB2018/059334 dated May 17, 2019 (1 page).

*Primary Examiner* — Tuyetlien T Tran
(74) *Attorney, Agent, or Firm* — Finnegan, Henderson, Farabow, Garrett & Dunner, LLP

(57) ABSTRACT

The present disclosure is related to a system and method for controlling widgets of a table on a display using a server. The system is configured to receive inputs from user for controlling widgets of the table by specifying at least one configuration at the server end for at least one of a plurality of predefined configurations. It determines a plurality of events and invokes at least one event handler at the server end according to a predefined interface for the determined event. The event handler would then provide the component with response behavior. Further, the system specifies a plurality of observable properties wherein any change in the properties would be automatically tracked by the system and invoking the specified at least one event handler to control at least one widget of the table.

9 Claims, 4 Drawing Sheets

(51) Int. Cl.
*G06F 16/958* (2019.01)
*G06F 40/177* (2020.01)
*G06F 40/18* (2020.01)

(56) References Cited

U.S. PATENT DOCUMENTS

| | | | | |
|---|---|---|---|---|
| 2004/0216042 | A1* | 10/2004 | Consolatti | G06F 9/542 715/234 |
| 2007/0038934 | A1* | 2/2007 | Fellman | G06F 3/0481 715/700 |
| 2009/0094339 | A1* | 4/2009 | Allen | H04L 67/34 709/206 |
| 2010/0257196 | A1* | 10/2010 | Waters | G06F 16/248 707/769 |
| 2012/0023407 | A1* | 1/2012 | Taylor | G06F 3/04842 715/731 |
| 2012/0179987 | A1* | 7/2012 | Mohan | G06F 8/38 715/762 |
| 2013/0262974 | A1* | 10/2013 | Anstis | G06F 40/18 715/217 |
| 2013/0346382 | A1* | 12/2013 | Varthakavi | G06F 16/958 707/706 |
| 2014/0258843 | A1* | 9/2014 | Krueger | G06F 40/166 715/234 |
| 2014/0365436 | A1* | 12/2014 | Calienes | H04L 67/1095 707/620 |
| 2015/0172150 | A1* | 6/2015 | Ding | H04L 67/02 709/203 |
| 2015/0186338 | A1* | 7/2015 | Mirra | G06Q 40/06 715/210 |
| 2015/0193418 | A1* | 7/2015 | Koska | G05B 19/0423 715/223 |
| 2015/0193421 | A1* | 7/2015 | Chitilian | G06F 40/18 715/217 |
| 2015/0286625 | A1* | 10/2015 | Escarguel | G06Q 30/0242 715/220 |
| 2016/0077810 | A1* | 3/2016 | Bertilsson | G06F 8/35 717/105 |
| 2017/0097742 | A1* | 4/2017 | Kim | G06F 9/451 |
| 2017/0242892 | A1* | 8/2017 | Ali | G06F 16/958 |
| 2017/0286467 | A1* | 10/2017 | Eberlein | G06F 16/211 |
| 2017/0357490 | A1* | 12/2017 | Park | G05B 15/02 |

* cited by examiner

SERVER CONTROLLED FRAMEWORK FOR CONTROLLING WIDGETS OF A TABULAR STRUCTURE

CROSS REFERENCE TO RELATED PATENT APPLICATIONS AND PRIORITY

This application is a U.S. national phase application of International Application No. PCT/IB2018/059334, filed Nov. 27, 2018, which claims priority under 35 U.S.C. § 119 to India Application No. 201821006492, filed on Feb. 20, 2018. The entire contents of the abovementioned applications are incorporated herein by reference.

TECHNICAL FIELD

The embodiments herein generally relates to the field of user interface tabular design and implementation framework, more particularly, a method and system for controlling widgets of a table using a server.

BACKGROUND

Tabular structures are often a vital part of user interface (UI) design and implementation. In existing state of the art, there are multiple table widget frameworks available, which could be configured to serve the requirements of the developer, for example, ExtJs tables, Dojo Tables etc. These tables could be added on to the UI through JavaScript renderers or HTML markups and the behavior of these tables are then controlled through the framework APIs on the client side.

Consider, as an example, a live process console which is to be monitored and controlled by a process technician and the developer would need to create two tabular structures such as a material property table, which is to display the real time variations in the material properties during a process and a process parameter table, which is to display the real time values of process parameters against the previous ones, wherein the user would as well need to update the current values and those should reflect in the process. Herein, the developer have to create two different tabular widgets, with different configurations, and handle the data flow in and out of the table including the live update of data, validations for the values provided by the user. For achieving this goal, the developer need to significantly leverage the capabilities of the front-end scripting languages.

Hence, these conventional frameworks often require a significant user-end scripting skill as the placement and behavior of the tables are controlled through client side scripting languages like JavaScript, VB Script etc. or the derivatives of those such as ExtJs, Dojo etc. Also, these frameworks often require separate handling both at the client side and the server side to fully operationalize these tables and would have to be differently developed even if the expected behaviour is mostly similar.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system and method for controlling one or more widgets of a table on a display using a server. Wherein, the operational aspects of the table is to be shifted to the server side from the client side. It allows the one or more widgets of the table to be placed at the user side with minimal scripting efforts.

In one aspect the embodiment here provides a method for controlling one or more widgets of a table on a display using a server. The method comprising one or more steps of specifying at least one configuration out of a plurality of predefined configurations at the server for controlling the one or more widgets of the table. One or more actions are received from a user as inputs and one or more events is determined corresponding to each received action of the user, wherein the one or more events are occurrences of the one or more actions by the user. Further, the user specifies at least one event handler from a plurality of event handlers at the server according to a predefined interface for each determined event and a universal resource identifier (URI) to each event handler for handling one or more events occurring at the user end for controlling one or more widgets of the table placed on the display. Further, one or more characteristics across a plurality of user interface are synchronized with the server and lastly it invokes at least one event handler to control at least one widget of the table based on the received one or more actions from the user. Moreover, the user specifies a plurality of observable properties of the table to enable just in time update of data on the table, wherein any change in the observable properties of the table is tracked for synchronizing the server side data with the user.

In another aspect the embodiment here provides a system for controlling one or more widgets of a table using a server. The system comprising a plurality of user interfaces, wherein the user interface is configured to place a table widget. Further, the system comprises a memory with a plurality of instructions, a processor and a server communicatively connected with each other. The system is configured for specifying at least one configuration out of a plurality of predefined configurations at the server for controlling the one or more widgets of the table. One or more actions are received from a user as inputs and one or more events are determined corresponding to each received action of the user, wherein the one or more events are occurrences of the one or more actions by the user. Further, the user specifies at least one event handler from a plurality of event handlers at the server according to a predefined interface for each determined event and a universal resource identifier (URI) to each event handler for handling one or more events occurring at the user end for controlling one or more widgets of the table placed on the display. Further, one or more characteristics across a plurality of user interface are synchronized with the server and lastly it invokes at least one event handler to control at least one widget of the table based on the received one or more actions from the user. Moreover, the user specifies a plurality of observable properties of the table to enable just in time update of data on the table, wherein any change in the observable properties of the table is tracked for synchronizing the server side data with the user.

In yet another embodiment herein provides a non-transitory computer readable medium storing one or more instructions which when executed by a processor on a system, cause the processor to perform method controlling one or more widgets of a table on a display using a server. The one or more instructions comprising specifying at least one configuration out of a plurality of predefined configurations at the server for controlling the one or more widgets of the table. One or more actions are received from a user as inputs and one or more events is determined corresponding to each received action of the user, wherein the one or more events are occurrences of the one or more actions by the user. Further, the user specifies at least one event handler from a plurality of event handlers at the server according to a predefined interface for each determined event and a universal resource identifier (URI) to each event handler for handling one or more events occurring at the user end for controlling one or more widgets of the table placed on the display. Further, one or more characteristics across a plurality of user interface are synchronized with the server and lastly it invokes at least one event handler to control at least one widget of the table based on the received one or more actions from the user. Moreover, the user specifies a plurality of observable properties of the table to enable just in time update of data on the table, wherein any change in the observable properties of the table is tracked for synchronizing the server side data with the user.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
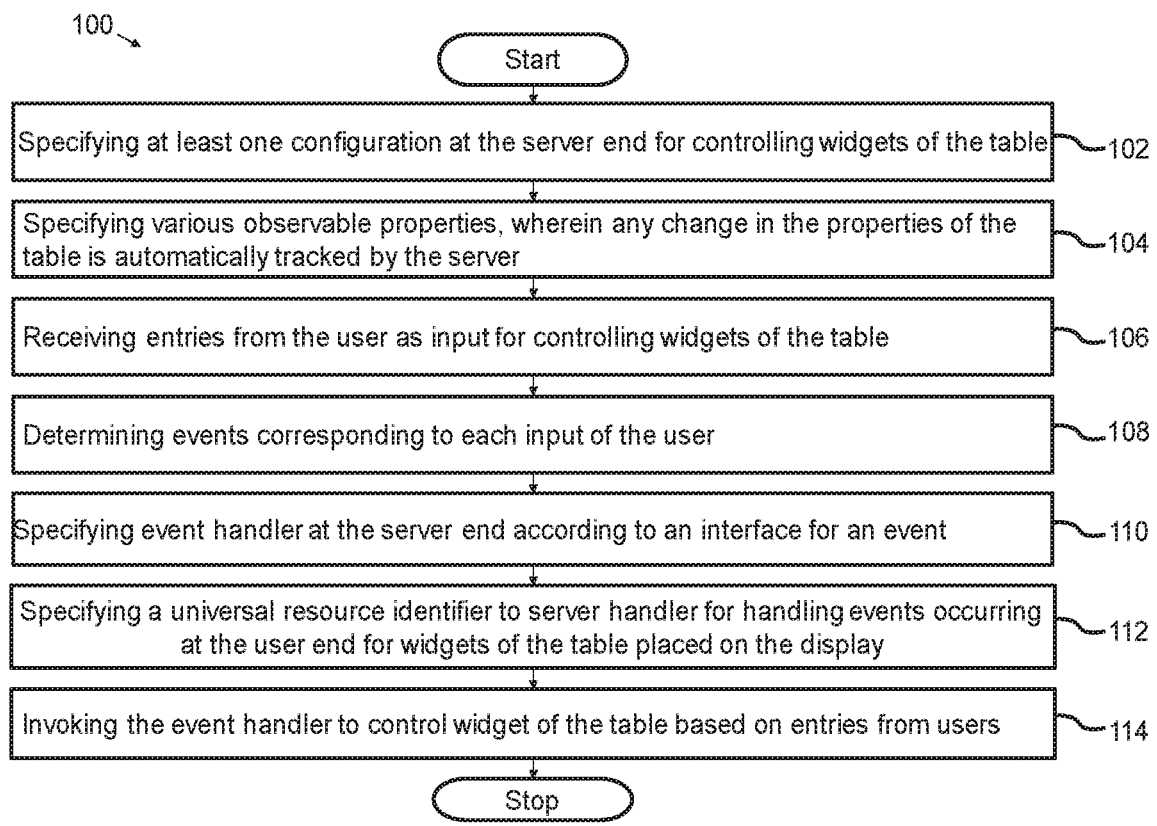
FIG. 1 is a flowchart illustrating one or more steps involved in controlling one or more widgets of a table using a server according to an embodiment of the present disclosure.
Figure 2:
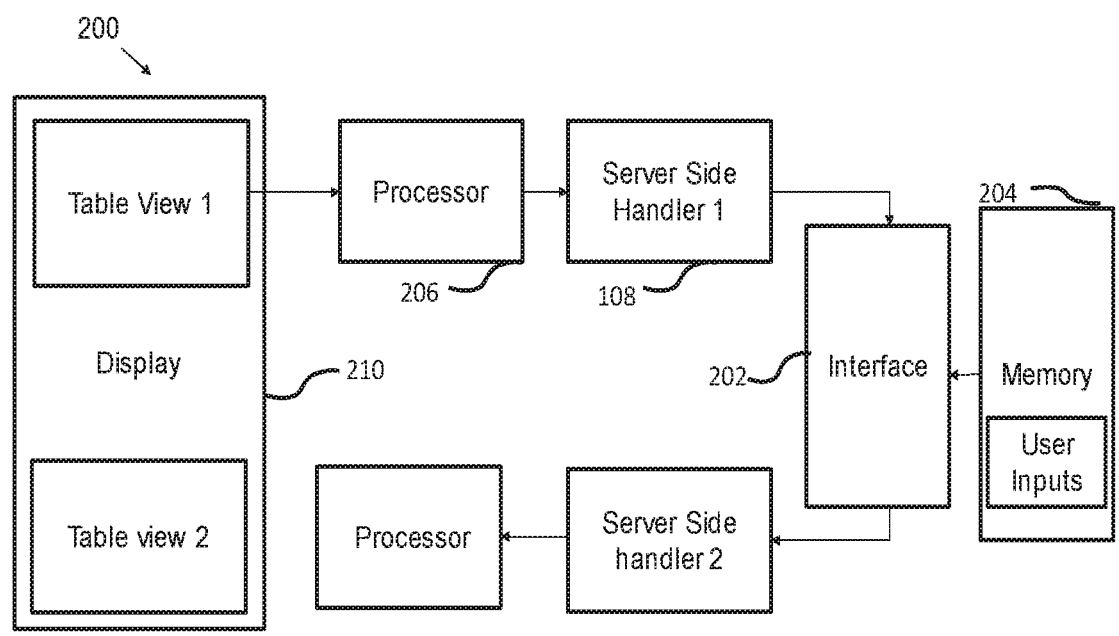
FIG. 2 illustrates a block diagram for controlling one or more widgets of a table using a server according to an embodiment of the present disclosure.
Figure 3A:
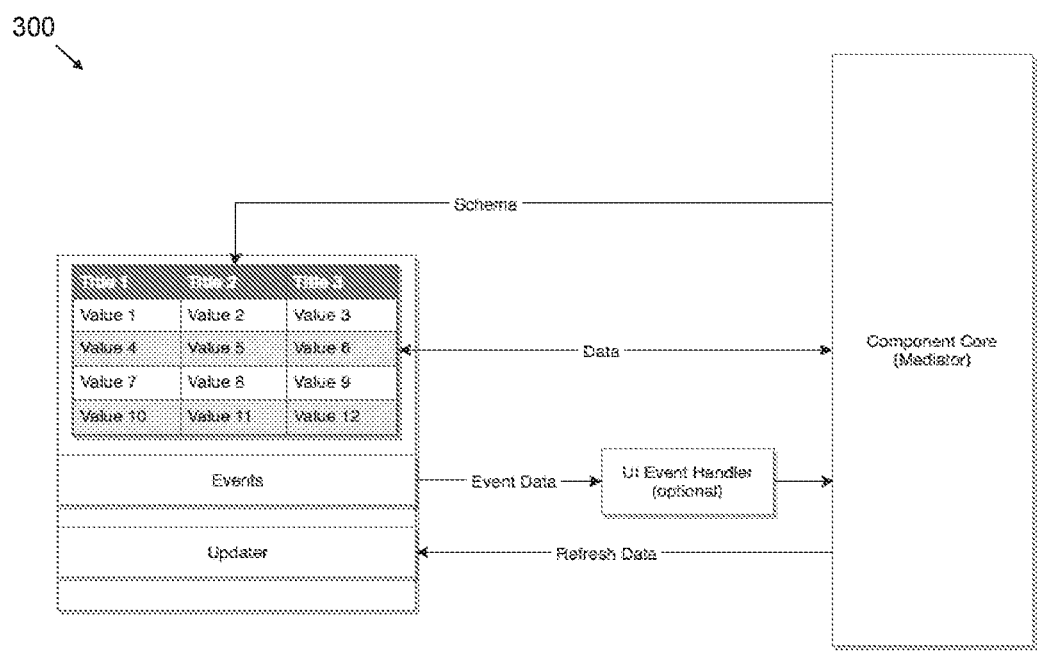
FIGS. 3(*a*) & 3(*b*) shows a schematic architectural view of the system according to an embodiment of the disclosure.
Figure 3B:
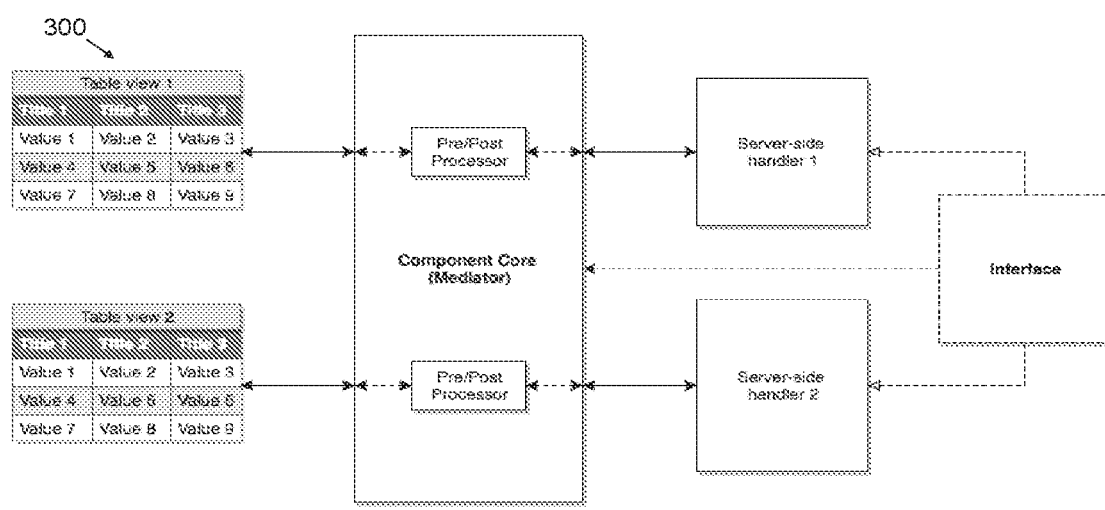

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

According to an embodiment of the disclosure, a method (100) for controlling one or more widgets of a table on a display using a server. The method (100) comprising one or more steps to control one or more widget of the table using a server and at the same time it allows a user to enable live update of data on the user interface table. Furthermore, the server can invoke an update UI (user interface) trigger which would synchronize the server-side data with the client UI.

Initially, at the step (102), where the user specifies at least one configuration of a plurality of predefined configurations at a server for controlling the one or more widgets of the table. The plurality of predefined configurations include allow row addition, allow row deletion, allow column addition, allow column deletion, column editable, column data type, cell editable, cell data type, cell allow empty and cell custom validations. In one example, wherein the user wants to specify a configuration at the server such as "column data type" to "number". Since the column data type is specified as number, the system would accept only numbers while editing the cells under this column.

At the step (104), where the user specifies a plurality of observable properties wherein any change in the properties of the table is automatically tracked by the system. In another example, if an observable property is defined at a handler, and the value of the property changes though any means, including user action, a specific event to notify the change of the property would be invoked.

At the step (106), where the process receives one or more actions from the user as input for controlling one or more widgets of the table.

At the step (108), where the process determines one or more events corresponding to each action made by the user. Further, the one or more events are also recognized by the software and that may be handled by the software. Usually, the events are handled synchronously with the program flow, that is, the software may have one or more dedicated places where events are handled as an event loop, which originates asynchronously from the external environment.

At the step (110), the user specifies at least one event handler from a plurality of event handlers at the server end according to a predefined interface for at least one determined event. The plurality of event handlers include initiating, initialized, schema initializing, schema initialized, data loading, data loaded, cell click, cell got focus, cell lost focus, cell text changing, cell text changed, row adding, row added, column adding, column added, row deleting, row deleted, data submitting, data submitted, validating, validated. In one example, the user would like to monitor the client activity on the display and log it to a file at the server. In this case, the user may write the log calls in the corresponding event handlers such as a message "cell [2, 3] was edited from 'abc' to 'abcd' is added on the cell text changed event.

At the step (112), where the user specifies a universal resource identifier (URI) to the server handler for handling one or more events occurring at the user end for controlling one or more widgets of the table placed on the display and synchronizing the one or more characteristics across the UI and the server. The user may provide additional configurations for customizing the behavior and these additional configurations would be synchronized across the server-end the plurality of event handlers.

At the step (114), where at least ones event handler is invoked to control at least one widget of the table based on the received one or more actions from the user or the system. In one example, if the user begins to edit a cell of the table, an event handler named 'cell editing' from the plurality of event handlers at the server-end would be invoked along with the contextual arguments. Based on the contextual arguments, the handler written for the event may suggest auto-fill data to the client table view.

According to an embodiment of the disclosure, a system (200) for controlling one or more widgets of a table on a display using a server is shown in FIG. 1. The system (200) comprising a plurality of user interfaces (202) a memory (204) with a set of instructions, a processor (206) communicatively connected with memory. A server (208) is configured to connect with the memory (204) and the processor (206) of the system. The server (208) is configured to invoke processor (206) for executing one or more steps for controlling one or more widgets of a table on the display (210).

According to an embodiment of the disclosure the plurality of user interfaces (202) are configured to provide a plurality of inputs to the processor (206). The plurality of input regarding making changes in the given specification to be inputted by the user for controlling one or more widgets. The user interface (202) can include a variety of software and hardware interfaces, for example, a web interface, a graphical user interface, and the like that can facilitate multiple communications within a wide variety of networks and protocol types, including wired networks, for example, LAN, cable, etc., and wireless networks, such as WLAN, cellular, or satellite.

According to an embodiment of the disclosure, the system (200) is configured to specify at least one configuration at the server (208) end based on the received one or more actions for at least one of a plurality of predefined properties for controlling the one or more widgets of the table. The plurality of configurations include allow row addition, allow row deletion, allow column addition, allow column deletion, column editable, column data type, cell editable, cell data type, cell allow empty and cell custom validations.

According to an embodiment of the disclosure, the system (200) is configured to a plurality of observable properties wherein any change in the properties would be automatically tracked by the system.

Referring FIGS. 3(a) & (b), a schematic diagram of an example, wherein the server controlled user interface table widget is shown. It comprises an UI implementation, component core and server side implementation. The UI implementation further comprising an UI table and a table handler API. The component core is divided across a client side and a server side, though acts singular. The component core is responsible for effectively routing the data between the table implementation at the client side and the server implementation at the server side. It would also track of its validations, the live data triggers and the observable objects. Further, the UI implementation comprises UI table view, an event listeners, a view updaters and UI event handlers. While the UI table view provide the tabular structure to the data and handle the appearance, the event listener, view updater checks for user actions and update the view respectively. The event handler executes any user specified client side event handling actions and/or request server side handling to the component core. The server side implementation primarily consists of a table controllers and various event handlers. While the table controllers take care of configuration and behavior control and the event handler provides the responses for the events the developers has implemented.

According to an embodiment of the disclosure, the system (200) is configured to specify at least one event handler at the server end according to a predefined interface for at least one determined event. The plurality of event handlers include initiating, initialized, schema initializing, schema initialized, data loading, data loaded, cell click, cell got focus, cell lost focus, cell text changing, cell text changed, row adding, row added, column adding, column added, row deleting, row deleted, data submitting, data submitted, validating and validated.

According to an embodiment of the disclosure, the system (200) is configured to specify at least one event handler to configure at least one widget of the table based on the received one or more actions from the user or the system.

According to an embodiment of the disclosure, the system (200) is configured to specify a universal resource identifier (URI) to the server handler for handling one or more events occurring at the user end for one or more widgets of the table placed on the display and synchronizing the one or more characteristics across the UI and the server. The user may provide additional configurations for customizing the behavior and these additional configurations would be synchronized across the server-end the plurality of event handlers.

According to an embodiment of the disclosure, the system (200) is configured to receive one or more actions from a user as inputs for controlling one or more widgets of the table. The user actions are validated against the configurations specified at the server-end.

According to an embodiment of the disclosure, the system (200) is configured to determine one or more events corresponding to each action made by the user. Further, the one or more events are also recognized by the software and that may be handled by the software. Usually, the events are handled synchronously with the program flow, that is, the software may have one or more dedicated places where events are handled as an event loop, which originates asynchronously from the external environment.

According to an embodiment of the disclosure, the system (200) is configured to invoke the specified at least one event handler to control at least one widget of the table based on the received one or more actions from the user or the system. In one example, if the user begins to edit a cell of the table, an event handler named 'cell editing' from the plurality of event handlers at the server-end would be invoked along with the contextual arguments. Based on the contextual arguments, the handler written for the event may suggest auto-fill data to the client table view.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein provides a method and system for controlling one or more widgets of a table on a display using a server, the method comprising receiving one or more actions from a user as an input for controlling one or more widgets of the table, specifying at least one configuration at the server end for at least one of a plurality of predefined configurations for controlling the one or more widgets of the table, determining a plurality of events, wherein the plurality of events are occurrences of the one or more actions by the user, specifying at least one event handler at the server end according to a predefined interface for at least one determined event, specifying a plurality of observable properties wherein any change in the properties would be automatically tracked by the system and invoking the specified at least one event handler to control at least one widget of the table based on the received one or more actions from the user.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

We claim:

1. A method for controlling one or more widgets of a table on a display interface using a server, the method comprising:
specifying at least one configuration out of a plurality of predefined configurations at the server for controlling the one or more widgets of the table;
specifying a plurality of observable properties of the table to enable just in time update of data on the table, wherein changes in the plurality of observable properties of the table is tracked for synchronizing server-side data with a user;
receiving one or more actions from the user as inputs for controlling the one or more widgets of the table;
determining one or more events corresponding to each received action of the user, wherein the one or more events are occurrences of the one or more actions by the user;
specifying at least one event handler from a plurality of event handlers at the server according to a predefined interface for each determined one or more events;
specifying a universal resource identifier (URI) to each of the plurality of event handlers for handling the one or more events occurring at an user end for controlling the one or more widgets of the table placed on the display interface and synchronizing one or more characteristics across a plurality of user interfaces and the server, wherein at least one change to the plurality of observable properties triggers a live update of the table on the display interface; and
invoking the at least one event handler to control at least one widget of the table from the one or more widgets based on the received one or more actions.

2. The method of claim 1, wherein the plurality of predefined configurations include allow row addition, allow row deletion, allow column addition, allow column deletion, column editable, column data type, cell editable, cell data type, cell allow empty and cell custom validations.

3. The method of claim 1, wherein the plurality of event handlers include initiating, initialized, schema initializing, schema initialized, data loading, data loaded, cell click, cell got focus, cell lost focus, cell text changing, cell text changed, row adding, row added, column adding, column added, row deleting, row deleted, data submitting, data submitted, validating, validated.

4. The method of claim 1, wherein the one or more actions of the user are automatically validated against the plurality of predefined configurations specified at the server.

5. A system for controlling one or more widgets of a table on a display interface using a server, the system comprising:
- a plurality of user interfaces, wherein one or more characteristics across the plurality of user interfaces are synchronized with the server;
- a memory with a plurality of instructions; and
- a processor, wherein the processor is communicatively coupled with memory, wherein the server is communicatively coupled with the processor and the memory, wherein the server is configured to execute on the processor to make the system capable of:
  - specifying at least one configuration out of a plurality of predefined configurations at a server for controlling the one or more widgets of the table;
  - specifying a plurality of observable properties of the table to enable just in time update of data on the table, wherein changes in the observable properties of the table is tracked for synchronizing server-side data with a user;
  - receiving one or more actions from the user as inputs for controlling one or more widgets of the table;
  - determining one or more events corresponding to each received action of the user, wherein the one or more events are occurrences of the one or more actions by the user;
  - specifying at least one event handler from a plurality of event handlers at the server according to a predefined interface for each determined one or more events;
  - specifying a universal resource identifier (URI) to each event handler for handling the one or more events occurring at an user end for controlling the one or more widgets of the table placed on the display interface and synchronizing one or more characteristics across a plurality of user interfaces and the server, wherein at least one change to the plurality of observable properties triggers a live update of the table on the display interface; and
  - invoking the at least one event handler to control at least one widget of the table from the one or more widgets based on the received one or more actions.

6. The system of claim 5, wherein the plurality of configurations include allow row addition, allow row deletion, allow column addition, allow column deletion, column editable, column data type, cell editable, cell data type, cell allow empty and cell custom validations.

7. The system of claim 5, wherein the plurality of event handlers include initiating, initialized, schema initializing, schema initialized, data loading, data loaded, cell click, cell got focus, cell lost focus, cell text changing, cell text changed, row adding, row added, column adding, column added, row deleting, row deleted, data submitting, data submitted, validating and validated.

8. The system of claim 5, wherein the user actions are automatically validated against the configurations specified at the server-end.

9. A non-transitory computer readable medium storing one or more instructions which when executed by a processor on a system, cause the processor to perform method controlling one or more widgets of a table on a display interface using a server comprising:
- specifying at least one configuration out of a plurality of predefined configurations at the server for controlling the one or more widgets of the table;
- specifying a plurality of observable properties of the table to enable just in time update of data on the table, wherein any change in the observable properties of the table is tracked for synchronizing server-side data with a user;
- receiving one or more actions from the user as inputs for controlling the one or more widgets of the table;
- determining one or more events corresponding to each received action of the user, wherein the one or more events are occurrences of the one or more actions by the user;
- specifying at least one event handler from a plurality of event handlers at the server according to a predefined interface for each determined one or more events;
- specifying a universal resource identifier (URI) to each of the plurality of event handlers for handling the one or more events occurring at an user end for controlling the one or more widgets of the table placed on the display interface and synchronizing one or more characteristics across a plurality of user interfaces and the server, wherein at least one change to the plurality of observable properties triggers live update of the table on the display interface; and
- invoking the at least one event handler to control at least one widget of the table from the one or more widgets based on the received one or more actions.

* * * * *